(12) United States Patent
Püttmann et al.

(10) Patent No.: US 6,238,141 B1
(45) Date of Patent: May 29, 2001

(54) APPARATUS FOR STATIC UNDERGROUND DRILLING

(75) Inventors: Franz-Josef Püttmann, Lennestadt; Andreas Riekes, Schmallenberg; Frank Prutti; Bernhard Kaufmann, both of Lennestadt, all of (DE)

(73) Assignee: Tracto-Technik-Paul Schmidt Spezialmaschinen, Lennestadt (DE)

( * ) Notice: Subject to any disclaimer, the term of this patent is extended or adjusted under 35 U.S.C. 154(b) by 0 days.

(21) Appl. No.: 09/281,455

(22) Filed: Mar. 30, 1999

(30) Foreign Application Priority Data

Mar. 30, 1998 (DE) ............................... 198 14 232
Oct. 28, 1998 (DE) ............................... 198 49 611

(51) Int. Cl.⁷ .................................................. E21B 17/04
(52) U.S. Cl. ............................................................ 405/184
(58) Field of Search .................................. 405/154, 156, 405/184

(56) References Cited

U.S. PATENT DOCUMENTS

| 1,210,187 | * | 12/1916 | Marquiss | 405/184 |
| 3,595,377 | * | 7/1971 | McCoy et al. | 198/181 |
| 4,522,273 | | 6/1985 | Larson . | |
| 5,127,481 | * | 7/1992 | Hesse | 175/295 |
| 5,284,404 | * | 2/1994 | Hu | 405/142 |
| 5,851,096 | * | 12/1998 | Lackner | 411/432 |
| 5,876,152 | * | 3/1999 | Hesse | 405/184 |
| 5,980,157 | * | 11/1999 | Puttman | 405/184 |

FOREIGN PATENT DOCUMENTS

| 370 8616 | | 9/1988 | (DE) . |
| 3902081 | * | 7/1989 | (DE) . |
| 526 743 | | 2/1993 | (EP) . |
| 736664 | | 10/1996 | (EP) . |
| 794 315 | | 9/1997 | (EP) . |
| 819 203 | | 10/1937 | (FR) . |

* cited by examiner

Primary Examiner—Robert E. Pezzuto
Assistant Examiner—Alexandra K. Pechhold
(74) Attorney, Agent, or Firm—Merchant & Gould P.C.

(57) ABSTRACT

In an apparatus for drilling in earth, a push-pull linkage, especially a ladder-type linkage consisting of individual sections connected together in each case by a plug-in coupling, is connected to a push-pull drive, and a stationary locking pawl and a thrust pawl which is moveable in the longitudinal direction of the linkage and is connected to the drive, with two mutually opposite directions of action, can each be brought into active connection with the linkage in order to move the linkage forward stepwise and lock it temporarily after each movement step.

15 Claims, 15 Drawing Sheets

APPARATUS FOR STATIC UNDERGROUND DRILLING

Figure 1:
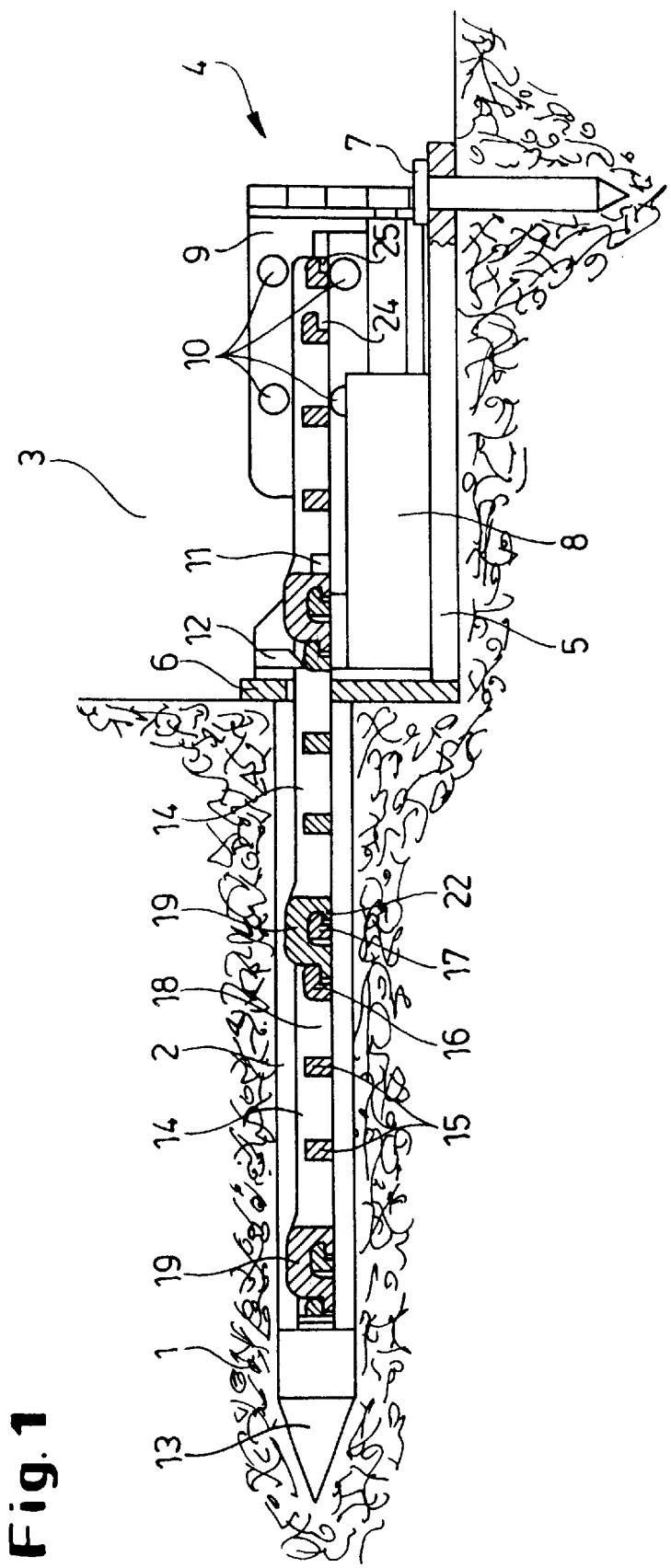

The invention relates to an apparatus for the static making or widening of microtunnels and/or the destruction of old pipework, in which a push-pull drive engages via coupling means on projections or in recesses of a linkage having a tool at the end.

A drilling apparatus of this type is disclosed in German Published Application 196 08 980. It consists of a mounting having a hydraulic piston/cylinder unit which moves a carriage linearly and reciprocally. The carriage is connected to a pawl which, when the carriage is advanced, engages behind a rung of the ladder-type linkage and thus moves the ladder-type linkage with the drilling head forwards in the drilling direction in accordance with the stroke of the hydraulic piston/cylinder unit. At the end of the stroke the pawl is automatically released from the rung and the carriage moves back into its starting position. During this, the ladder-type linkage is not fixed and, accordingly, generally recoils to a greater or lesser extent under the action of the -earth on the drilling head at the front end of the ladder-type linkage. In this way, the advance of the linkage is shortened, at every stroke, to a greater or lesser extent depending on the composition of the earth. Since this happens after each stroke, and since a great many strokes are necessary when drilling over longer distances, the recoil inevitably leads to a substantial loss of performance. An additional effect of the recoil is that the pawl and the ladder-type linkage are no longer in the reciprocal position which guarantees that the pawl engages between two rungs of the ladder-type linkage. In this event, the linkage and/or the pawl have to be pushed towards one another until the pawl is located precisely above the intervening space between two ladder rungs.

This loss of performance is not only noticeable when the apparatus is being used for drilling, but also when, for example at the end of a pilot drilling operation, the drilling head is replaced by a widening or clearing head and this is drawn back through the pilot drilling to the launch pit because in the case of widening, too, the .earth exerts an action on the pulling linkage counter to the direction of movement of the widening or clearing head and moves the former a greater or lesser distance back when the carriage moves back to its starting position.

The object of the invention is thus to avoid the loss of performance resulting from the abovementioned recoil of the linkage when drilling a hole with a clearing head and/or when widening a pilot drilling or, alternatively, when destroying and replacing ground-laid pipework with the aid of a tool.

The object is achieved by means of the independent claims. Advantageous embodiments will be found in the subclaims.

In detail, the object is achieved in that the apparatus is provided, according to the invention, with at least one linkage locking system which fixes the linkage in the position of advance achieved after each stroke, when the coupling means is released from the linkage.

The linkage locking system consists preferably of two mutually opposing retaining jaws or of a locking pawl which is lowered automatically after passing over a linkage rung and engages behind the rung, until the rung moves on in the direction of advance during the next stroke.

The locking pawl can be so arranged that it can be pivoted through approximately 180° and, accordingly, exerts its locking action in both directions of the ladder-type linkage. This is readily possible if the locking pawl possesses, for example, two stopping faces arranged at an angle with respect to each other between which a stopping lug extends by means of which the locking pawl is supported in one or the other direction on a ladder rung.

The apparatus is provided, in a further preferred embodiment, with at least one dragging pawl, for example a stationary locking pawl, and a thrust pawl which is moveable in the longitudinal direction of the linkage and is connected to the push-and-pull drive with, in each case, two directions of action.

These pawls also can, for example, be arranged on a pivot pin in such a manner that they can be pivoted through approximately 180° and, accordingly, exert their action in both directions of the linkage. This is readily possible if, for example, the pawls possess one or even two stopping faces arranged at an angle to one another with which they can be brought into a non-positive or positive active connection with the linkage in one direction or the other.

In this manner, it is possible to move the linkage forwards stepwise in push or pull operation, with the aid of the thrust pawl, and to fix it after each movement step, with the aid of the stationary locking pawl, until the linear drive with the thrust pawl has returned to its starting position and the thrust pawl again comes into active connection with the linkage.

In order to allow this, the pawls may be so contoured that they each possess at least one sliding surface. The sliding surface makes it possible for the thrust pawl, during the backward movement of the linear drive, to be slid or dragged loosely over the linkage, for example over the rungs of a ladder-type linkage, until, at the beginning of the advancing movement, it again comes into active connection or engagement with the linkage. On the other hand, during the advancing movement of the linkage, the locking pawl slides by means of its sliding surface over the linkage until, at the end of the advancing movement of the linkage, it again comes into active connection or engagement with the linkage and temporarily locks the linkage. Here again, a type of dragging movement takes place.

The locking pawl and, optionally, the thrust pawl also should be capable of being locked in a neutral position in order to enable the linkage to be displaced reciprocally without obstruction.

In pull operation, for example if a widening or clearing head is to be pulled through a pilot drilling or a trolley provided with cutting discs or a bursting head is to be drawn through ground-laid pipework in order to destroy ground-laid pipework, in order to slit the walls of the pipe in the longitudinal direction, the two pawls merely need to be pivoted by hand or automatically through approximately 180° in order to come into active connection or engagement with the linkage in alternation, in the manner already described in connection with push operation, The locking pawl is preferably fixed to the apparatus, and the thrust pawl is preferably arranged on a moveable carriage connected to a linear drive. A double-action hydraulic cylinder may serve as a linear drive. In this case, the two cylinder spaces can be connected via one hydraulic line each, having a ¾-way valve, to a pressure source; between the hydraulic lines a shuttle valve is connected, having a manometer which measures the current pressure in each case and, when the maximum pressure is achieved, switches the ¾-way valve by means of a control unit and so connects one or the other hydraulic line to the pressure source.

This permits automatic operation of the advancing trolley, so that manual work is now required only for the insertion and coupling of the linkage sections. In addition, damage can be avoided if the apparatus is set to maximum insertion and/or pulling pressure, so that the apparatus is automatically switched off if it meets an unexpected obstacle in the soil.

If the apparatus according to the invention is used to draw a cutting trolley and, at a distance behind it, a widening or clearing head also through ground-laid pipework, in order first to slit the pipework open in the longitudinal direction and then to widen it with the aid of the widening or clearing head, together with the surrounding earth, and at the same time to draw a new pipe into the earth with the aid of the widening head, then a high flexural stress may be imposed on the linkage connection between the cutting trolley and the widening head.

The invention provides a remedy here in the form of an articulated connection of the linkage, for example consisting of at least three linkage sections, which are connected to each other via, in each case, pivot pins extending at right angles to one another. In this manner, what is generally a type of universal joint is produced, with the aid of which the cutting trolley, the clearing head and the new pipework can easily be drawn into the microtunnel created by the clearing head. Alternatively, the cutting trolley and the towed clearing head can also be moveably connected to each other via a chain or a cable.

The linkage preferably consists of individual sections which can be connected to each other via a plug-in coupling. The plug-in coupling may be such that it permits a degree of lateral play and, accordingly, steered drilling along a curved line. This is possible because the lateral play between the individual linkage sections has a cumulative effect such that drilling is possible on a curved track which covers an angle of up to 90°.

The frame of the apparatus is preferably telescopic and may possess an end plate which is guided in the frame via struts. The end plate serves as a support for the apparatus when, with the aid of the linkage, the clearing head is pulled through a pilot drilling or an ground-laid pipe towards the frame.

The end plate may be provided with a slide which closes an aperture in the end plate. The aperture in the end plate offers the possibility that the clearing head, after it has moved through the pilot drilling or a ground-laid pipe, can completely leave the earth; in doing so, it moves, together with any earth and fragments of ground-laid pipework which may be pushed in front of it, into the clear space between the end plate and the frame of the apparatus. There, the clearing head can readily be released from the linkage, and from any follow-up pipe, without damaging the microtunnel created by it.

Since the clearing head is customarily used at the same time to pull new pipework, in the form of a follow-up pipe, into the widened microtunnel, a connection between the clearing head and the front end of the follow-up pipe is required. In the case of a follow-up pipe wound into a bundle, customarily of polyethylene, it is difficult because of the curvature of the pipe end caused by the winding and its powerful recoil to produce a sufficiently secure connection to the clearing head.

The invention provides a remedy here in the form of an articulated connection of at least three joint sections which are connected to each other via, in each case, pivot pins extending at right angles to one another. In this manner, what is generally a type of universal joint is produced, with the aid of which the front end of the pipe can easily be drawn into the microtunnel created by the clearing head.

Figure 2:
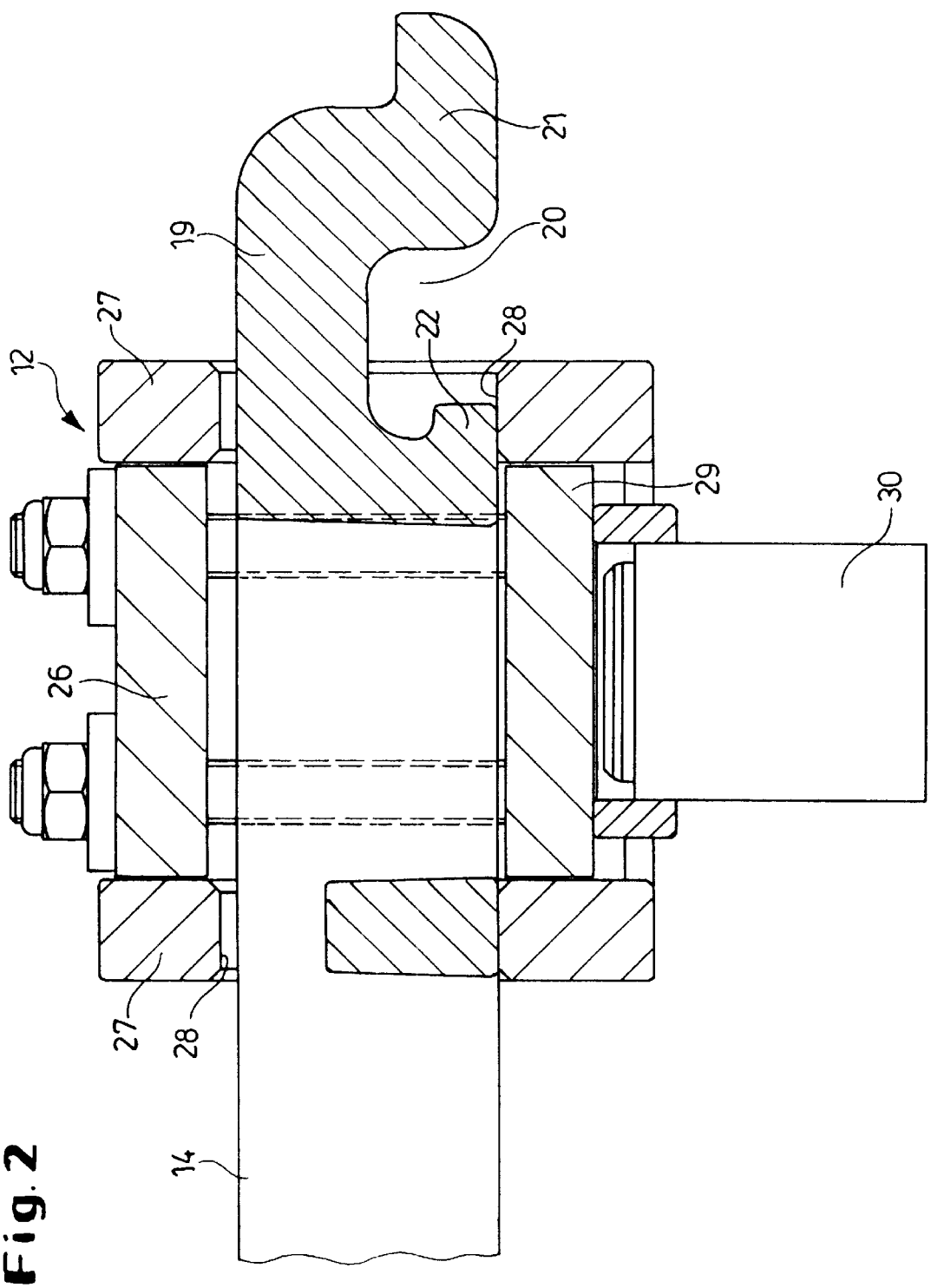
Figure 3:
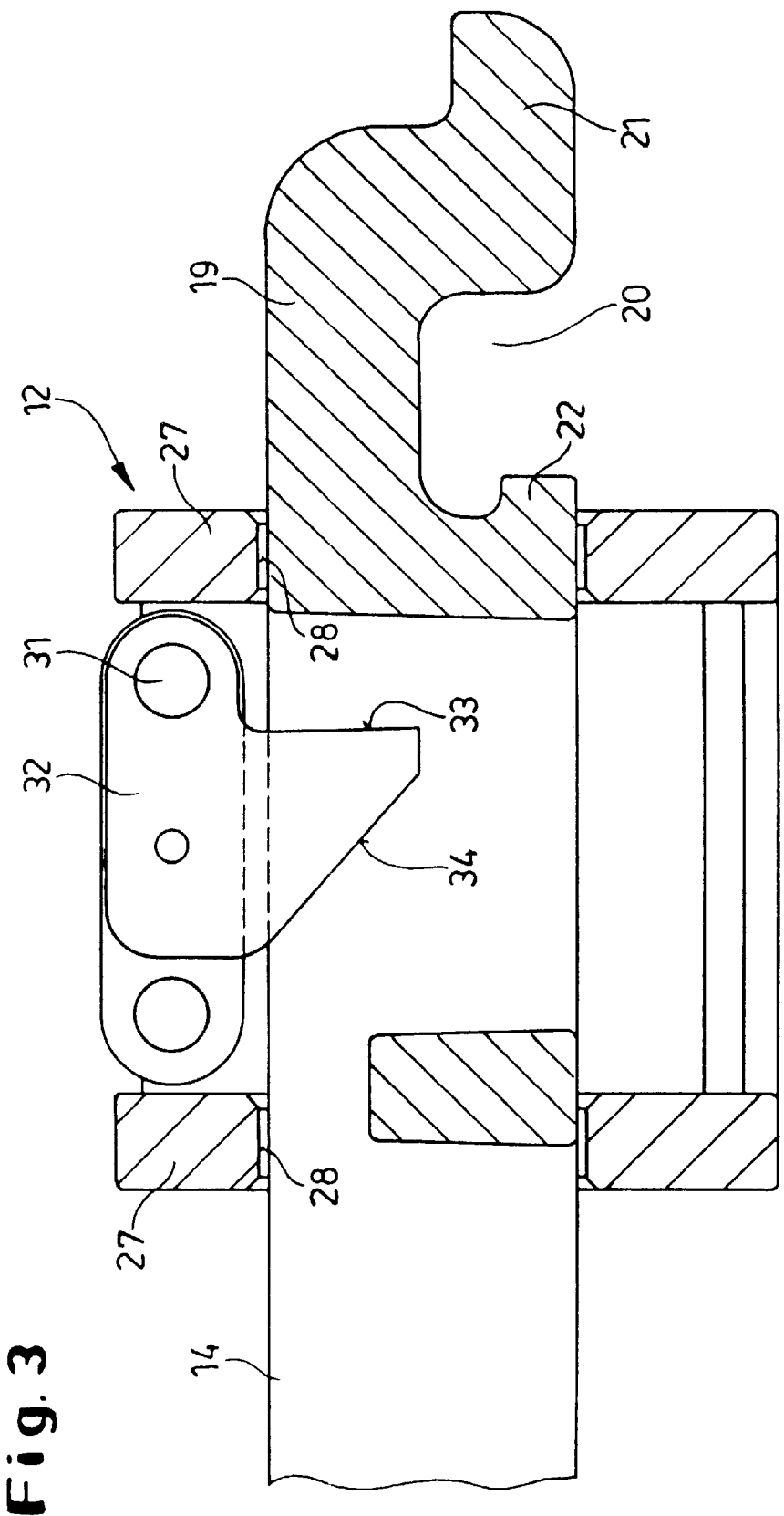
Figure 4:
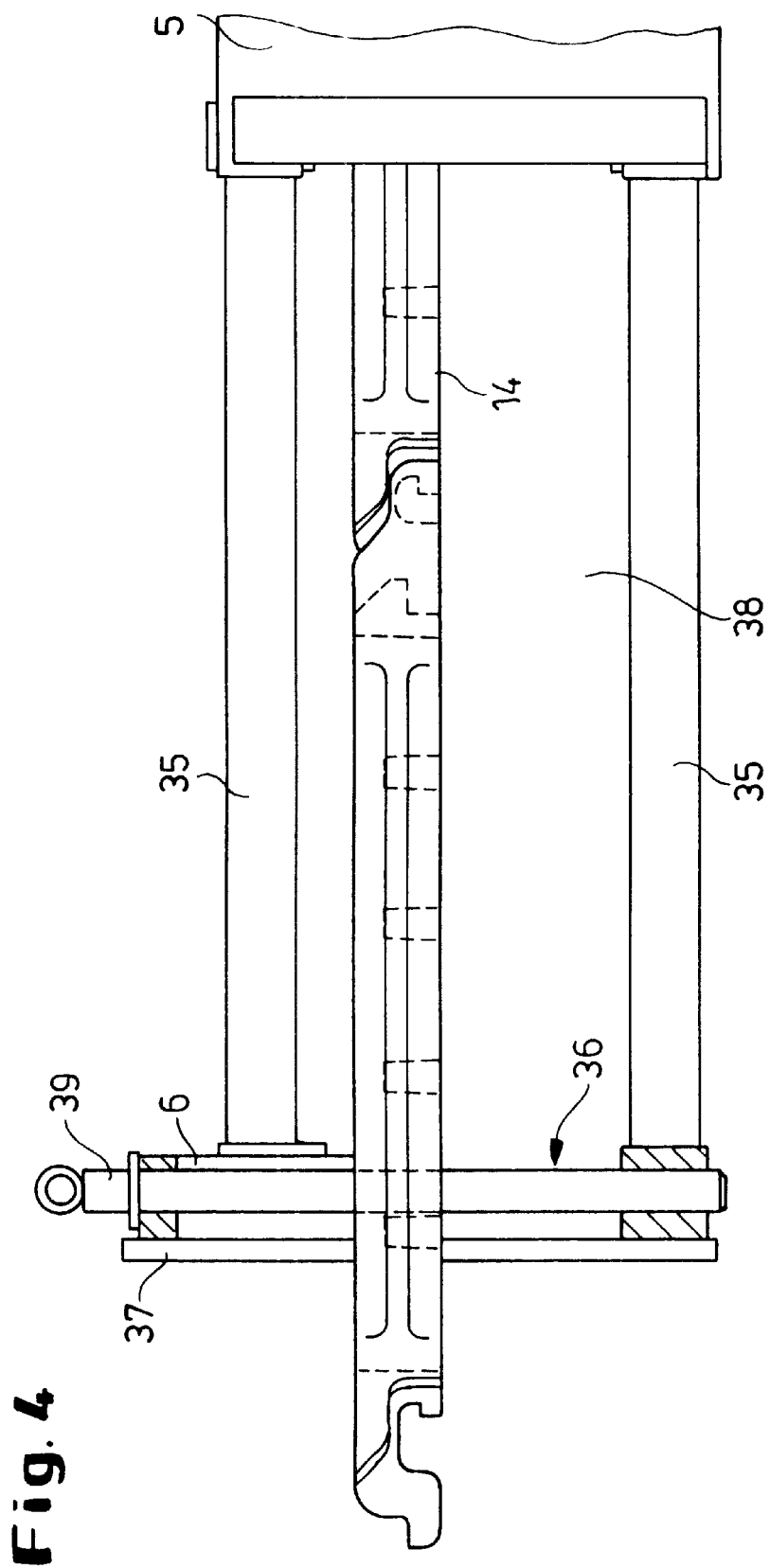
Figure 5:
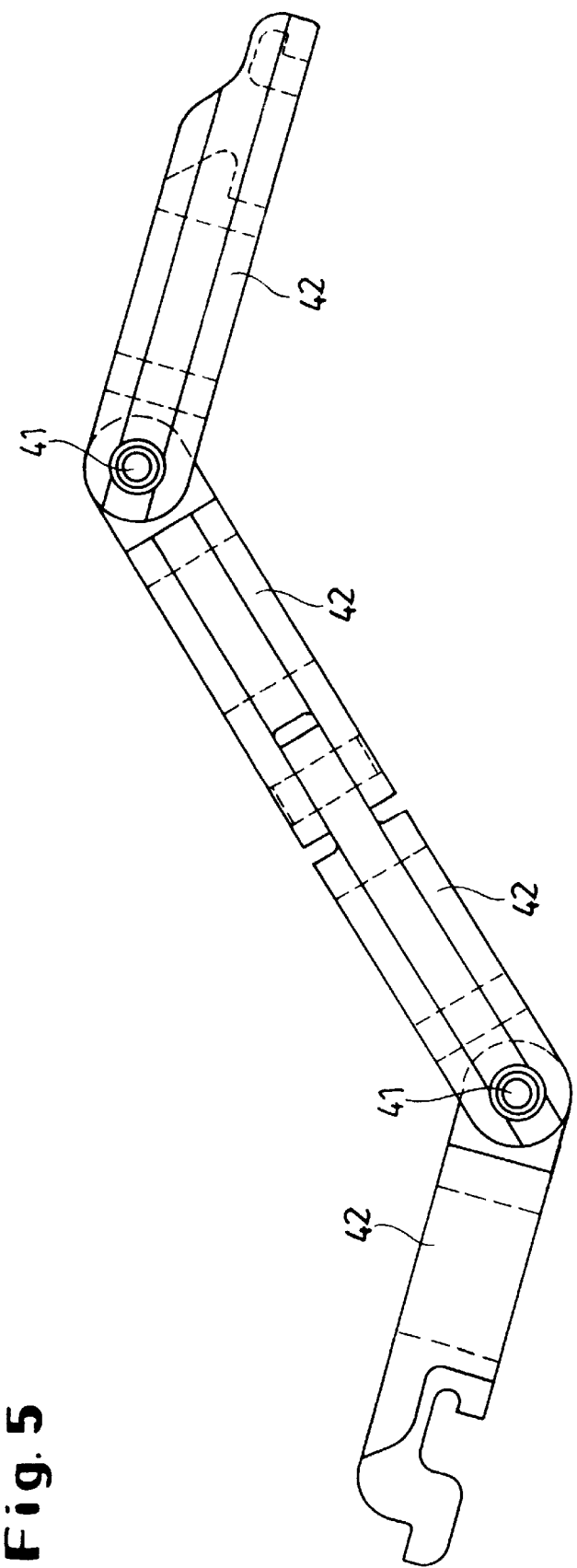
Figure 6:
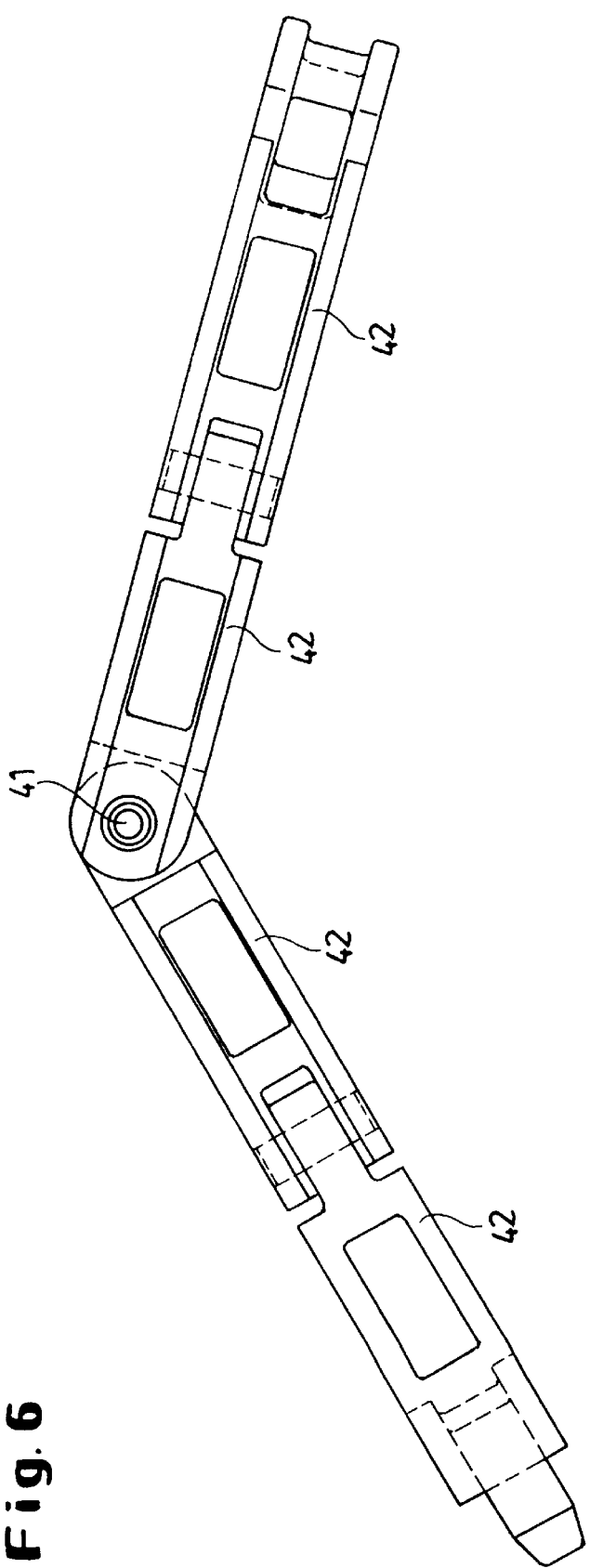
Figure 7:
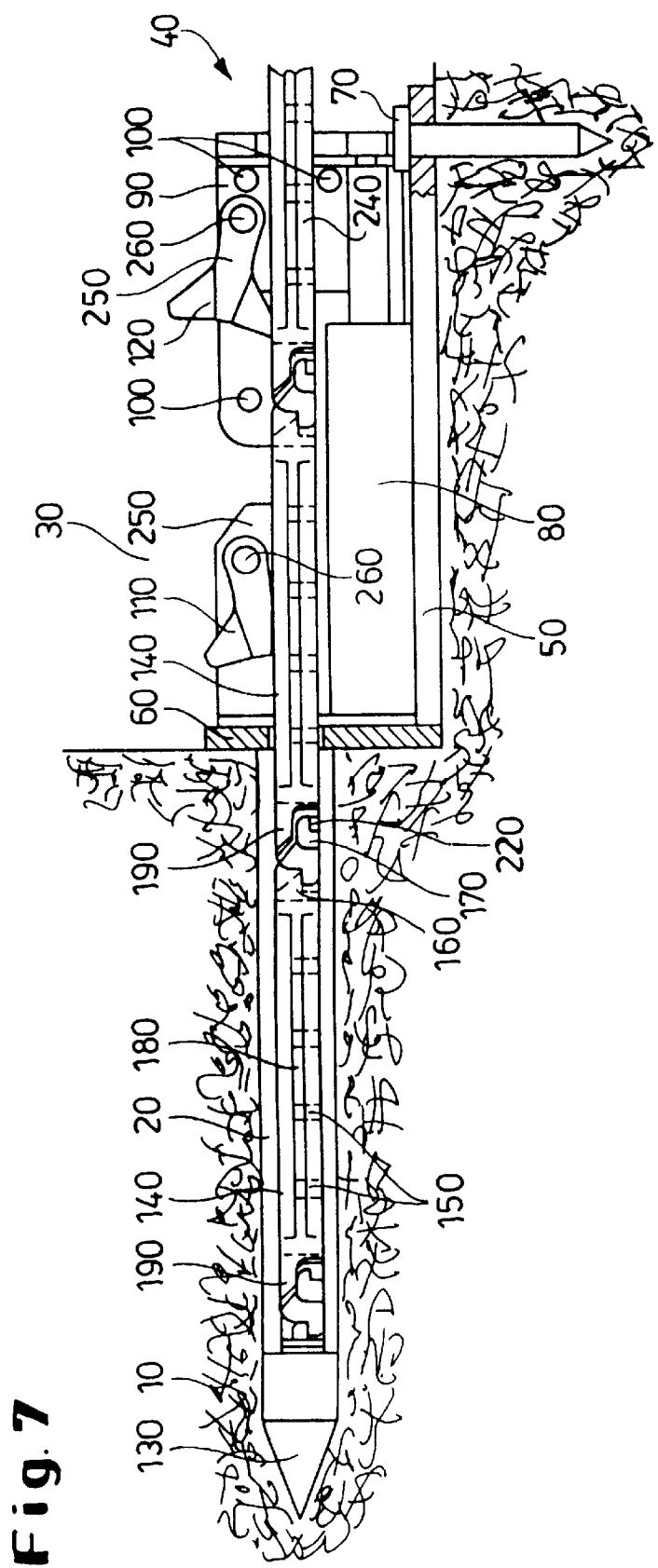
Figure 8:
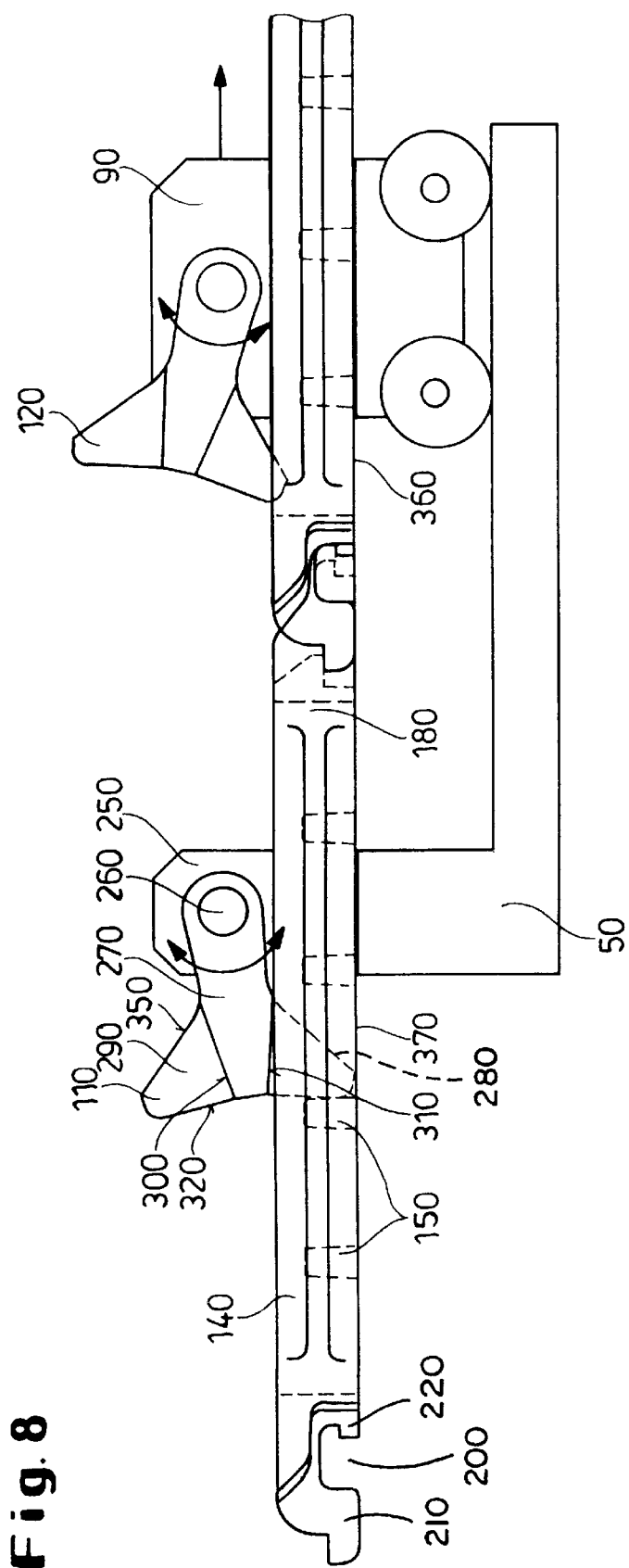
Figure 9:
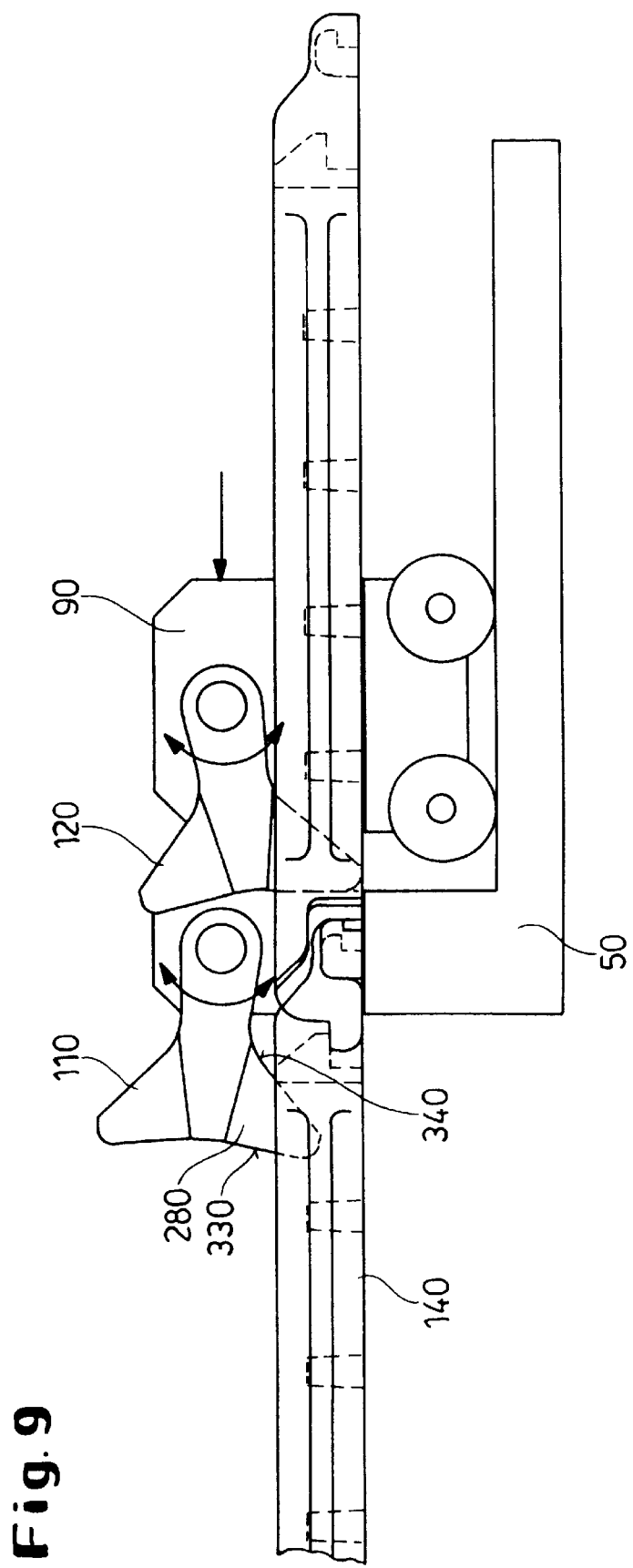
Figure 10:
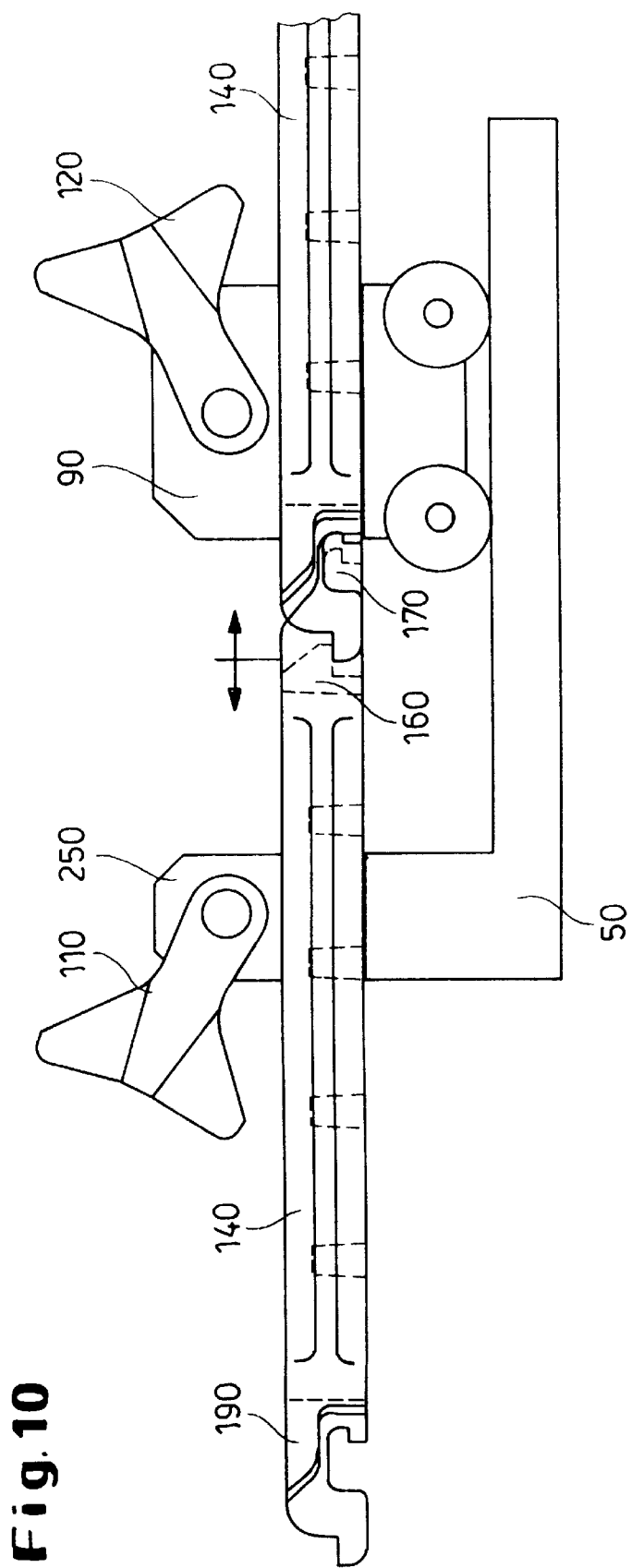
Figure 11:
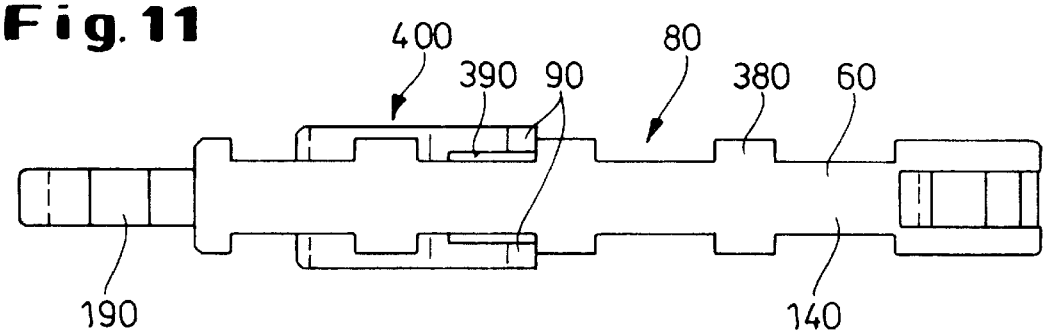
Figure 12:
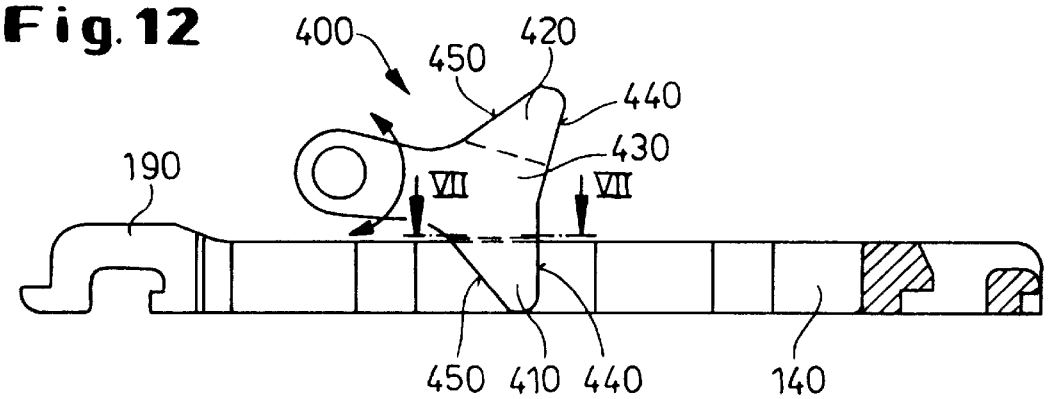
Figure 13:
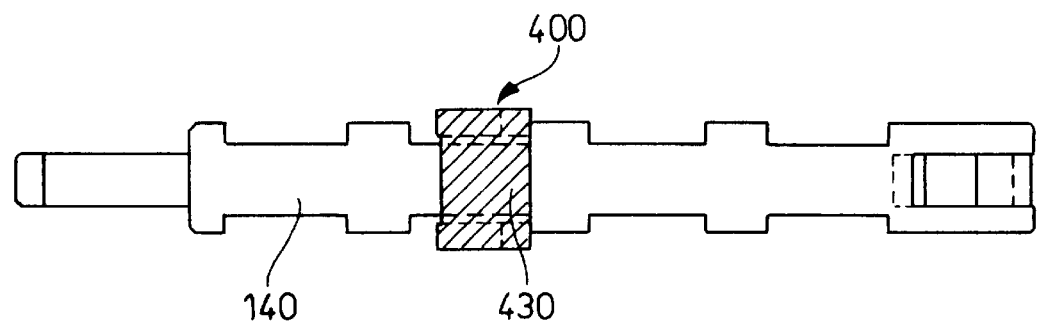
Figure 14:
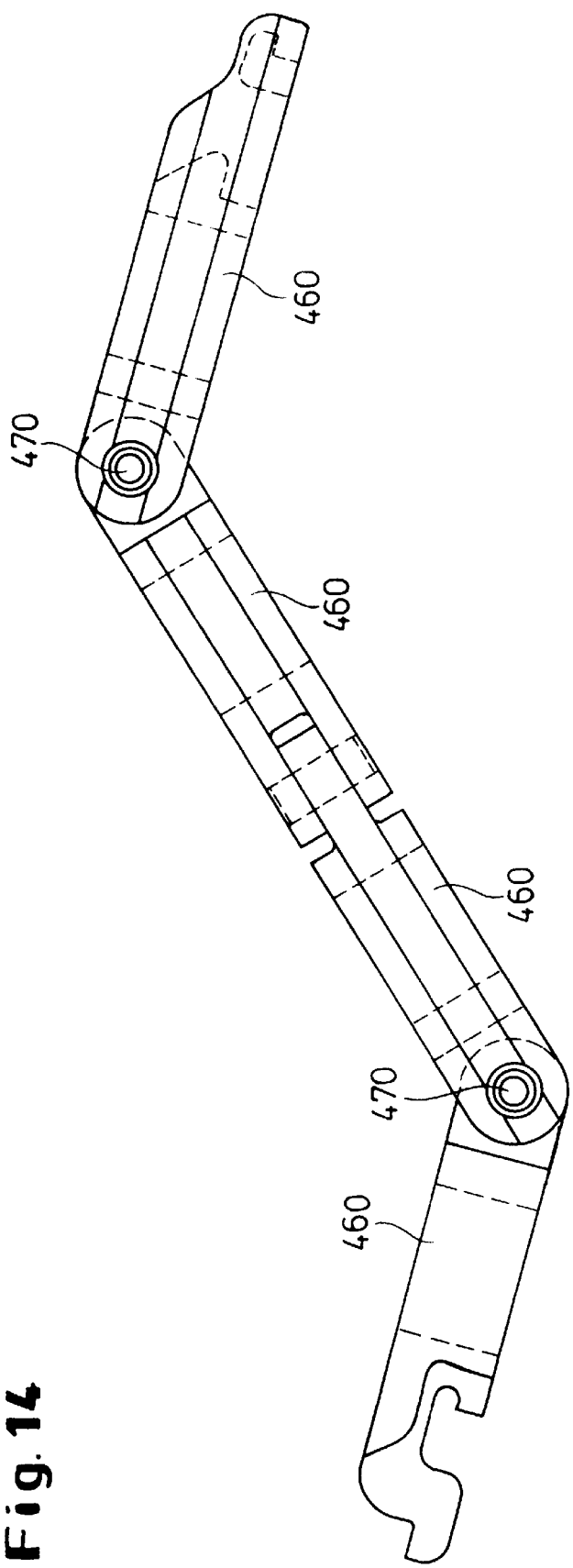
Figure 15:
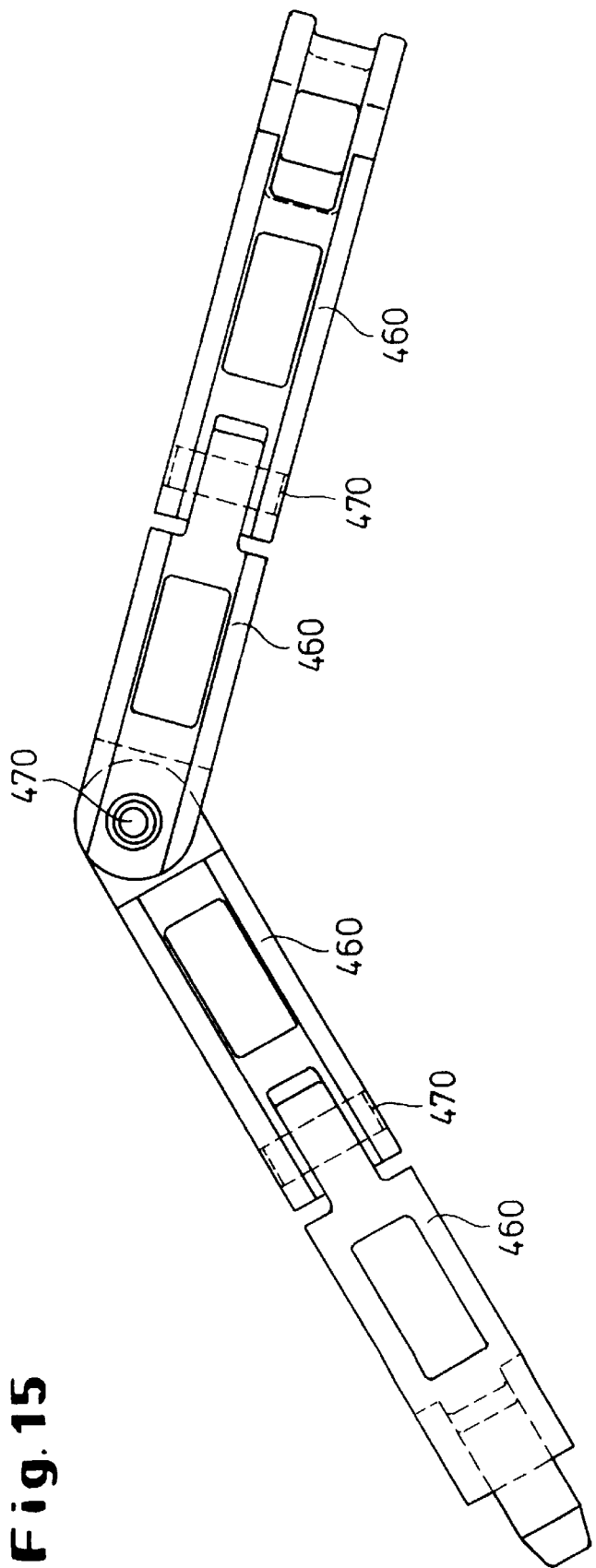
Figure 16:
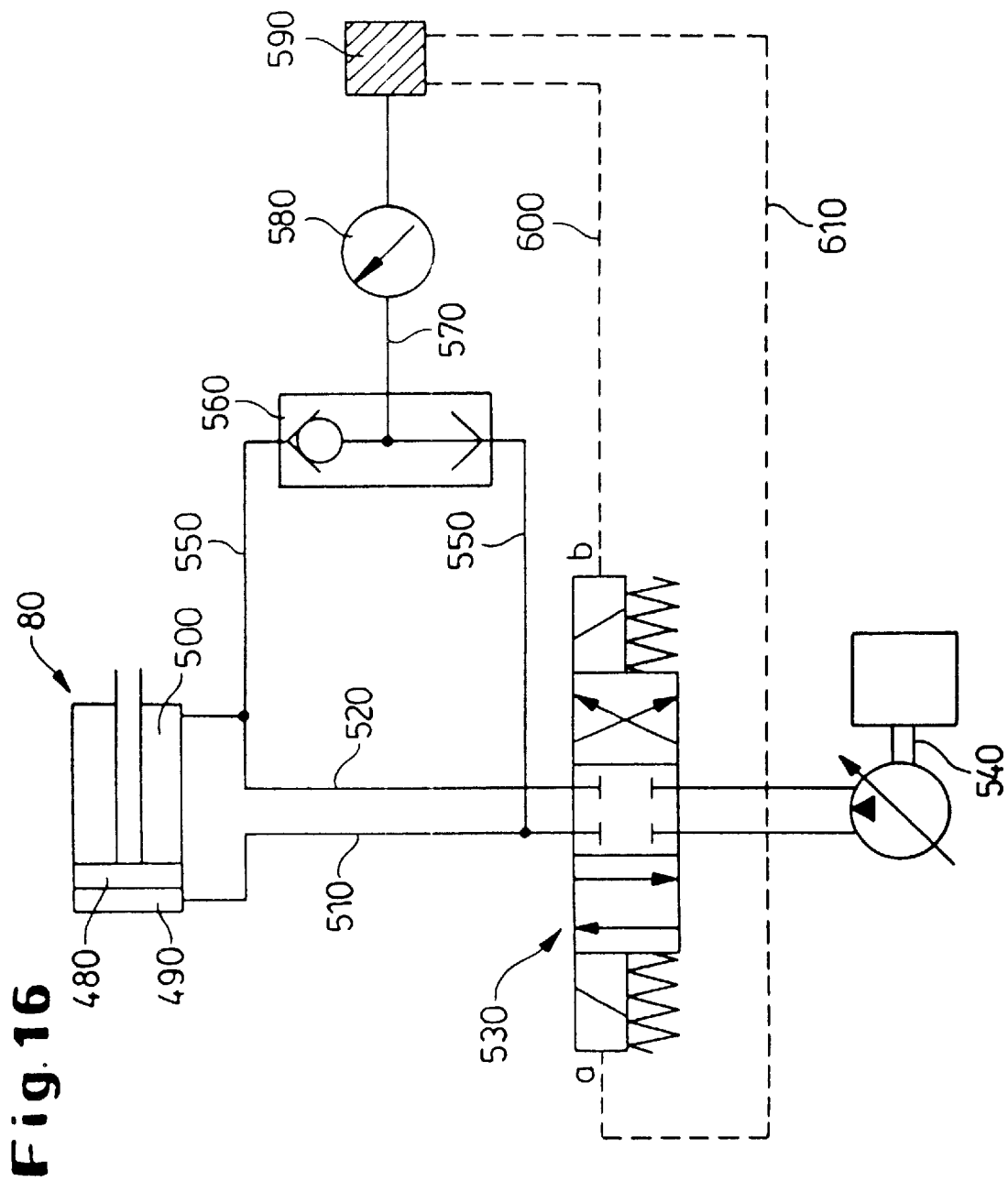
Figure 17:
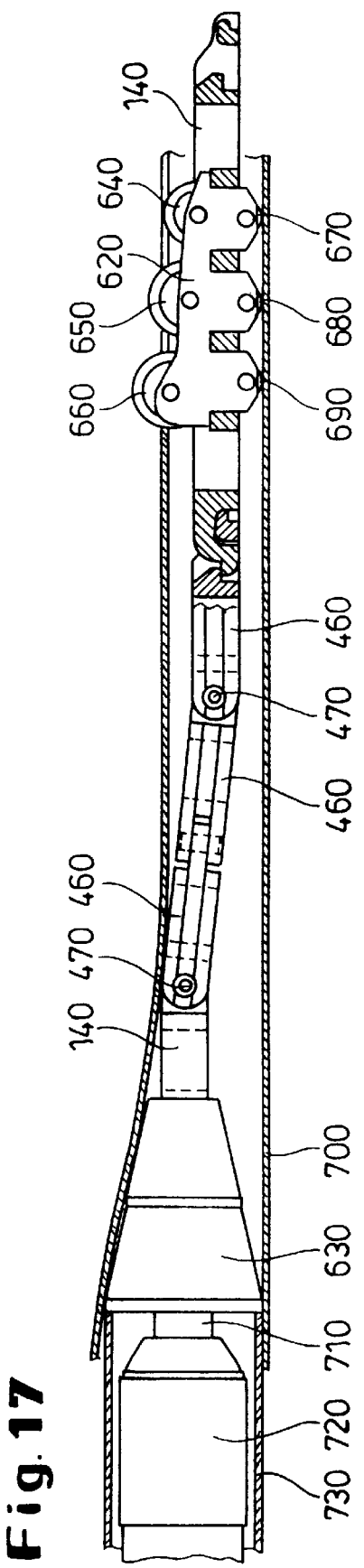

The invention is explained in detail below with reference to examples of embodiments shown in the drawing, in which:

FIG. 1 shows a drilling apparatus in the course of making a pilot drilling,

FIG. 2 shows a linkage locking system according to the invention with retaining jaws, FIG. 3 shows a linkage locking system in the form of a simply acting locking pawl, FIG. 4 shows a telescopic frame, and FIG. 5 shows a cardanic link in a lateral view, and FIG. 6 in a plan view, FIG. 7 shows the drilling apparatus in the course of making a pilot drilling, FIG. 8 shows the linkage of the drilling apparatus according to FIG. 1 with the push-and-pull drive and the two pawls in the final phase of the backward movement in push operation, FIG. 9 shows the linkage and drive at the end of the advancing movement, FIG. 10 shows the pivoting of the pawls at the transition from push to pull operation, FIG. 11 shows a plan view of a linkage section with projections and a claw-type pawl, FIG. 12 shows a lateral view of the linkage section according to FIG. 11, FIG. 13 shows a section along the line VII—VII in FIG. 12, FIG. 14 shows a cardanic linkage section in a lateral view, FIG. 15 shows a plan view of the linkage section according to FIG. 14, FIG. 16 shows a circuit diagram for the automatic control of the linear drive for the pawl carriage, and FIG. 17 shows a cutting disc trolley with a towed widening head.

By means of the apparatus according to the invention, a microtunnel 2 is driven statically into the earth 1, starting from a launch pit 3. To this end, a push-pull drive 4 is located in the launch pit 3. Its stationary frame 5 is supported by means of an end plate 6 on the face of the earth 1 located in the direction of advance and is retained by means of one or more soil anchors 7. Arranged on the mounting 5 is a hydraulic piston/cylinder unit 8 which reciprocally moves a carriage 9. Pairs of guide bolts 10 in the carriage 9 serve to guide the sections 14 of a drilling linkage. Other linkage sections 14 are connected to the linkage section 14 retained in the carriage 9 via a plug-in coupling.

The linkage sections 14 consist, in the manner of a ladder, of rungs 15 and parallel struts 18.

At the end of each linkage section 14 is a coupling head 19 which interacts with the penultimate rung and the last rung 17 of the neighbouring linkage section 14. The coupling head 19 is provided with a recess 20, which engages over the last rung 17, while a lug 21 on the coupling head 19 engages into a cut-out 24 on the penultimate rung 16 and a lug 22 engages into a cut-out 25 in the last rung 17. The coupling head is so dimensioned here that the connection between neighbouring linkage sections 14 possesses a degree of play which permits a linkage movement along a curved path.

In the making of a microtunnel 2 by the pressing into the earth of the linkage, consisting of individual sections 14, with the drilling head 13, a locking system 12 serves to fix the linkage axially when the carriage returns to its starting position after completing its forward stroke.

The linkage locking system 12 consists, as shown in FIG. 3, of a frame with a retaining jaw 26 and two guide plates 27 with apertures 28 for the ladder-type linkage 14. A clamping jaw 29 is guided between the plates 27 and is pressed against the ladder-type linkage in the forward stroke cycle by the piston 30 of a hydraulic cylinder (not shown).

Another linkage locking system is shown in FIG. 3; it likewise consists of a frame with two plates 27 with in each case one aperture 28 for the linkage and possesses a locking pawl 32 mounted pivotably on a pin 31 whose stopping edge 33 comes to lie in a locking manner against a linkage rung, while an oblique portion 34 of the locking pawl 32 slides over the rungs.

A strut 35 is guided in a linearly movable manner in the frame 5 of the push-pull drive 4 at each of the corner points of a quadrilateral. The struts 35 support the end plate 6, in which there is an aperture 36. This aperture can be closed with the aid of a slide 37 and permits the passage of a clearing head pulled through a pilot drilling or a ground-laid old pipe into the free space 38 between the end plate 6 and the frame 5. In this free space, the clearing head can be separated without particular difficulties from the linkage 14 and from a new pipe pulled by it into the earth, which then projects out of the earth to a certain extent and can therefore be effortlessly connected to an adjoining new pipe.

The end plate can readily be moved out with the aid of the linkage 14 after the insertion of a bolt 39 between two rungs.

The new pipe is drawn in with the aid of a connection consisting of at least three linkage sections 42, which are connected to each other via pivot pins 41 extending in each case at an angle of 90° to each other (FIGS. 5, 6) In this manner, a cardanic connection is produced between the new pipe and the clearing head, which substantially facilitates the drawing-in of the front end of the pipe into the microtunnel created by the clearing head.

An example of embodiment of the invention is described below.

By means of the apparatus according to the invention, a microtunnel 20 is driven statically into the earth 10, starting from a launch pit 30. To this end, a push-pull drive 40 is located in the launch pit 30. Its stationary frame 50 is supported by means of an end plate 60 on the face of the launch pit 30 located in the direction of advance and is retained by means of one or more soil anchors 70. Arranged on the frame 50 is a linear drive in the form of a push-and-pull drive 80, such as a piston/cylinder unit, which reciprocally moves a carriage 90. Pairs of guide bolts 100 in the carriage 90 and pawls 110, 120 serve to guide and move the sections 140 of a drilling linkage. The linkage sections 140 are connected to the linkage section 140 retained in the carriage 90 via a plug-in coupling.

The linkage sections 140 consist, in the manner of a ladder, of rungs 150 and parallel struts 180.

At the end of each linkage section 140 is a coupling head 190 which interacts with the penultimate rung 160 and the last rung 170 of the neighbouring linkage section 140. The coupling head 190 is provided with a recess 200, which engages over the last rung 170, while a lug 210 on the coupling head 190 engages into a cut-out 240 in the penultimate rung 160 and a lug 220 engages into a cut-out 250 on the last rung 170. The coupling head is so dimensioned here that the connection between neighbouring linkage sections 140 possesses a degree of play which permits a linkage movement along a curved path.

In the making of a microtunnel 20 by the stepwise pressing into the earth of the linkage, consisting of individual sections 140, with the aid of a tool in the form of a drilling head 130, a locking pawl 120, shown only diagrammatically, serves to fix the linkage in the longitudinal direction when the carriage 90 returns to its starting position after completing its forward stroke.

The locking pawl 110 is arranged in a stationary manner on a boom 250 of the frame 50 and consists of a pivot arm 270 mounted to rotate on a transverse pin 260 and having two centrally arranged wings 280, 290. The pivot arm 270 engages over the ladder-type linkage 140 transversely to the axis of the linkage and possesses two mutually opposite stopping faces 300, 310, while the wings 280, 290 of the locking pawl 110, which in a lateral view is of approximately Y-shaped design, are provided at the ends with stopping faces 320, 330 and with sliding surfaces 340, 350.

The advancing trolley 90 is equipped with a thrust pawl 120 whose design matches that of the locking pawl 110.

As is apparent from the view in FIG. 8, the locking pawl 110 is in active connection with the linkage section 140 as a result of its stopping face 330 resting on a rung 150. In this manner, the linkage is prevented, during the backward movement of the carriage 90, from moving in the direction of the carriage movement, i.e. is locked. During the backward movement of the carriage 90 the thrust pawl 120 passes over the individual linkage rungs 150 in a manner such that the sliding surface 340 slides over the individual rungs, until the carriage 90 has reached its starting position and the wing 280 of the thrust pawl 120 falls under the action of gravity into the window 360 between the rungs 150 and the struts 180 of the linkage. In the event of a reversal of movement of the carriage 90, i.e. in the advancing movement—towards the left in FIG. 8—the stopping face 330 of the thrust pawl 120 impacts on the rung 150 located in front of it, as a result of which the advancing carriage 90 is coupled non-positively and positively to the ladder-type linkage because of the slightly V-shaped arrangement of the stopping faces 320, 330, so that the ladder-type linkage is moved out of its position shown in FIG. 8 to the position shown in FIG. 9 at the end of the forward movement. During this movement, the locking pawl 110 slides with its sliding surface 340 away over the rungs 150, until it falls under the action of gravity, at the end of its forward stroke, with its wings 280 into the window 370 located below it and the stopping faces 310 on both sides impact on the struts 180.

FIG. 10 shows how the drilling apparatus is switched from push-operation (FIGS. 8, 9) to pull operation. To achieve this, all that is necessary is for the locking pawl 110 and the thrust pawl 120 to be pivoted through approximately 180° out of their position shown in FIGS. 8, 9, in order then to move the linkage in the opposite direction or lock it. This occurs in the same manner as in push operation, but with the difference that the wings 290 and the stopping faces 310 and 320 now enter into action.

The linkage may also, in accordance with the illustrations in FIGS. 11 to 13, be provided with projections 380, lying opposite each other in pairs, on which pawls 400 equipped with a claw-like bit 390 engage. In this case, the pawls 400 possess four wings 410, 420, which are connected to each other in pairs by a common web-like central part 430. Between the web-like central part 430 and each pair of wings 410, 420 is the bit 390, which engages in the manner of a claw or a U over the linkage section 140. The web-like central part 430 functions here as the stop limiting the pivot movement of the pawl 400. The wings 410, 420 likewise possess stopping faces .440 and slide surfaces 450, in the same way as the pawls 110, 120.

A linkage consisting of the linkage sections 140 with projections 380 is suitable in the same way as the linkage consisting of the ladder-shaped linkage sections 140 both for push operation and for pull operation (FIGS. 11 to 13). The only difference lies in the fact that, in this case, the pawls 400 each possess only two mutually opposite stopping faces on the web-like central part 430 and four front stopping faces 440 arranged in pairs and interacting with the projections 380.

In the event that the risk of excessive flexural stressing of the linkage exists, the linkage can be of cardanic design as shown in FIGS. 14, 15. In this case, the cardanic part of the linkage consists of at least three linkage sections 460 which are connected to each other by pivot pins 470 extending in each case at an angle of 90° to each other. In this manner, a cardanic connection is obtained which is particularly suitable for the lengthwise division of a ground-laid pipeline with the aid of a cutting disc trolley to which a towed widening head is assigned.

The advancing trolley 90 is, according to FIG. 16, connected to a linear motor in the form of a double-action cylinder 80 having a piston 480, whose cylinder spaces 490, 500 are connected via two hydraulic lines 510, 520 to a ¾-way valve 530 with a pressure medium source 540. From the hydraulic line 520, a branch line 550 leads via a shuttle valve 560 to the hydraulic line 510. The shuttle valve 560 is connected via a line 570, having a manometer 580, to a control unit 590 from which two control lines 600, 610 lead to the ¾-way valve 530.

The automatic control for the advancing trolley 90, shown in FIG. 16, operates by a method in which the pressure rise taking place shortly before the dead centre position of the piston 480 in the two cylinder spaces. 490, 500 is converted by means of the manometer 580 into a signal for the control unit 590, which then switches the ¾-way valve via the lines 600, 610 so that the cylinder space in which the pressure rise takes place is provided with pressure oil and the piston 480 begins its movement in the opposite direction.

The cardanic joint linkage according to FIGS. 14, 15 is particularly suitable if, for example, a cutting disc trolley 620 is connected via a linkage 460, 470 to a towed widening head 630, as described in German Patent Application 198 31 190.7. The cutting disc trolley 620 is provided with three cutting discs 640, 650, 660 arranged at different heights and support rollers 670, 680, 690 lying opposite these. The widening head 630 serves to widen a ground-laid pipe 700 slit in the longitudinal direction by the cutting rollers of the cutting trolley 620 and is connected via an articulated coupling 710 to a follow-up pipe 720 whose front end projects into a short protective sleeve 730 connected to the widening head.

The apparatus according to the invention requires only one operative to insert the individual linkage sections and to move the pawls over in the event of a reversal of the working direction of the linkage; the locking pawl and the thrust pawl take their positions automatically at the end of each forward and backward movement of the automatically controlled advancing trolley. The apparatus according to the invention is therefore exceptionally economical both as regards its production costs and as regards its operating costs.

What is claimed is:

1. An apparatus for making or widening microtunnels, or for destroying ground-laid pipework or drawing-in pipes, having
    a frame,
    a push-and-pull drive,
    a linkage in driven connection therewith,
    a tool at an end of the linkage,
    at least one dragging pawl for engaging the linkage, the at least one dragging pawl being pivotably mounted to the frame, whereby it may be pivoted to prevent movement in either a forward or a backward direction.

2. The apparatus as claimed in claim 1, wherein the push-and-pull drive is arranged on a carriage, the carriage having a hydraulic cylinder serving as a double-action cylinder linear drive.

3. The apparatus as claimed in claim 2, wherein at least one of the carriage and the hydraulic cylinder is connected to end switches controlling the hydraulic cylinder, whereby an operating direction of the hydraulic cylinder may be reversed.

4. The apparatus as claimed in claim 3, further comprising two cylinder spaces within the hydraulic cylinder and a pressure medium source, and hydraulic cylinder lines connecting the pressure medium source to the two cylinder spaces via a ¾-way valve, wherein the hydraulic cylinder lines are connected via a shuttle valve to a manometer for measuring the current pressure in the hydraulic cylinder lines, and wherein a control unit is in communication with the manometer whereby the control unit switches the ¾-way valve when a maximum pressure is reached and thus providing pressure from the pressure source to one or the other cylinder space.

5. The apparatus as claimed in claim 1, wherein the at least one pawl is provided with sliding surfaces.

6. The apparatus as claimed in claim 1, wherein the at least one pawl has a Y-shaped cross-section.

7. The apparatus as claimed in claim 1, wherein the linkage consists of individual sections, the individual sections being coupled together so as to permit relative movement whereby the linkage may move along a curved path.

8. The apparatus as claimed in claim 1, further comprising a drilling tool connected via an articulated connection to a towed widening head.

9. The apparatus as claimed in claim 1, wherein the linkage comprises at least three linkage sections connected with pivot pins, wherein each pivot pin extends at a right angle to neighboring pivot pins.

10. The apparatus as claimed in claim 1, wherein the at least one pawl is automatically pivotable.

11. The apparatus as claimed in claim 1, wherein the linkage comprises at least three linkage sections connected with pivot pins, wherein each pivot pin extends at a right angle to neighboring pivot pins.

12. Method for making or widening microtunnels or for fragmenting or renewing old pipework underground, the method comprising the steps of engaging a ladder-type linkage with a first coupling means, driving the linkage into the ground via said first coupling means, engaging the linkage with a second coupling means, releasing and retrieving said first coupling means, engaging the linkage with said first coupling means and releasing said second coupling means.

13. Method as claimed in method 12 characterized by retrieving the ladder-type linkage from the ground by rotating said first and second coupling means into a position of reverse engagement, engaging the linkage with said first coupling means, withdrawing said ladder-type linkage from the ground via said first coupling means, engaging the linkage with said second coupling means, releasing and retrieving said first coupling means, engaging the linkage with said first coupling means and releasing said second coupling means.

14. Method as claimed in claim 12 wherein the process of pushing and pulling is automated.

15. Method as claimed in claim 12 wherein the process is controlled by a remote control system.

* * * * *